No. 816,693. PATENTED APR. 3, 1906.
H. WARFIELD.
CONVERTIBLE CULTIVATOR AND PLANTER.
APPLICATION FILED OCT. 12, 1904.

2 SHEETS—SHEET 1.

Witnesses
Inventor
H. Warfield
By
Attorneys

No. 816,693. PATENTED APR. 3, 1906.
H. WARFIELD.
CONVERTIBLE CULTIVATOR AND PLANTER.
APPLICATION FILED OCT. 12, 1904.
2 SHEETS—SHEET 2.
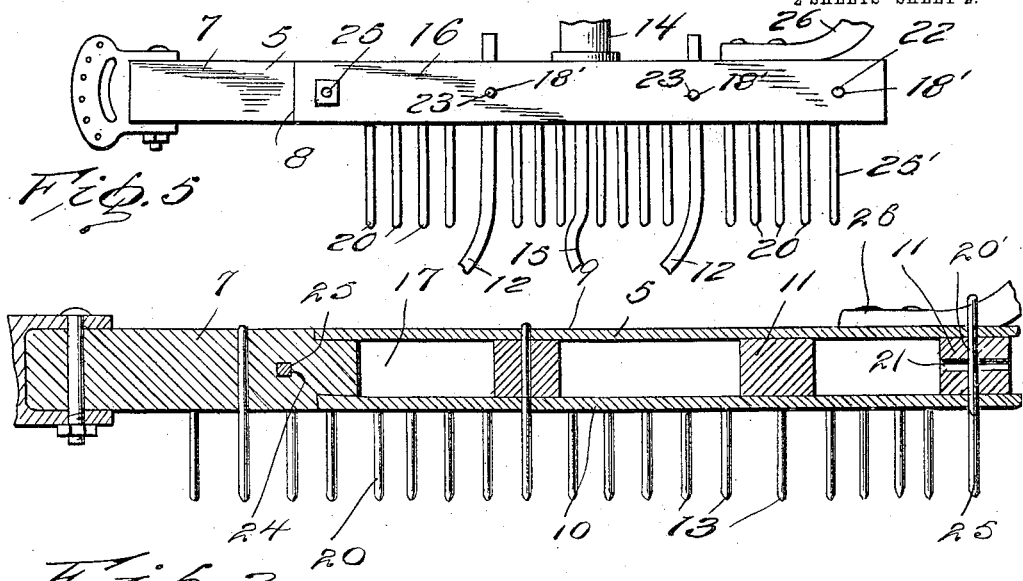
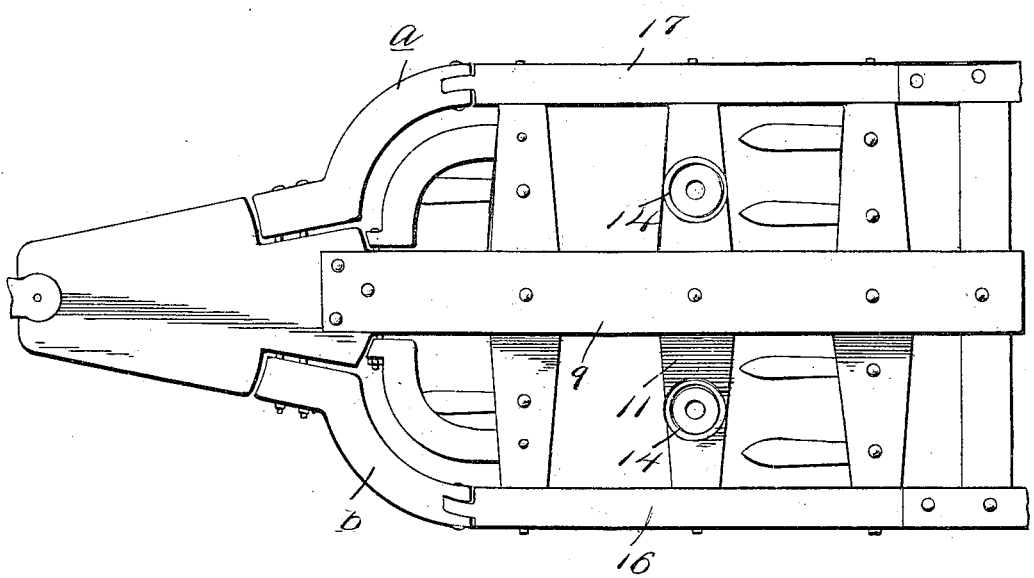

UNITED STATES PATENT OFFICE.

HENRY WARFIELD, OF TOPEKA, KANSAS.

CONVERTIBLE CULTIVATOR AND PLANTER.

No. 816,693.     Specification of Letters Patent.     Patented April 3, 1906.

Application filed October 12, 1904. Serial No. 228,159.

*To all whom it may concern:*

Be it known that I, HENRY WARFIELD, a citizen of the United States, residing at Topeka, in the county of Shawnee, State of Kansas, have invented certain new and useful Improvements in Convertible Cultivators and Planters; and I do hereby declare the following to be a full, clear, and exact description of the invention, such as will enable others skilled in the art to which it appertains to make and use the same.

This invention relates to farm implements, and more particularly to combination implements, and has for its object to provide an implement of this nature which may be converted into a planter or a harrow, as desired, the arrangement of parts being such that the implement may be simply and quickly converted from one to the other.

Other objects and advantages will be apparent from the following description, and it will be understood that modifications of the specific construction shown may be made and any suitable materials may be used without departing from the spirit of the invention.

Figure 1:
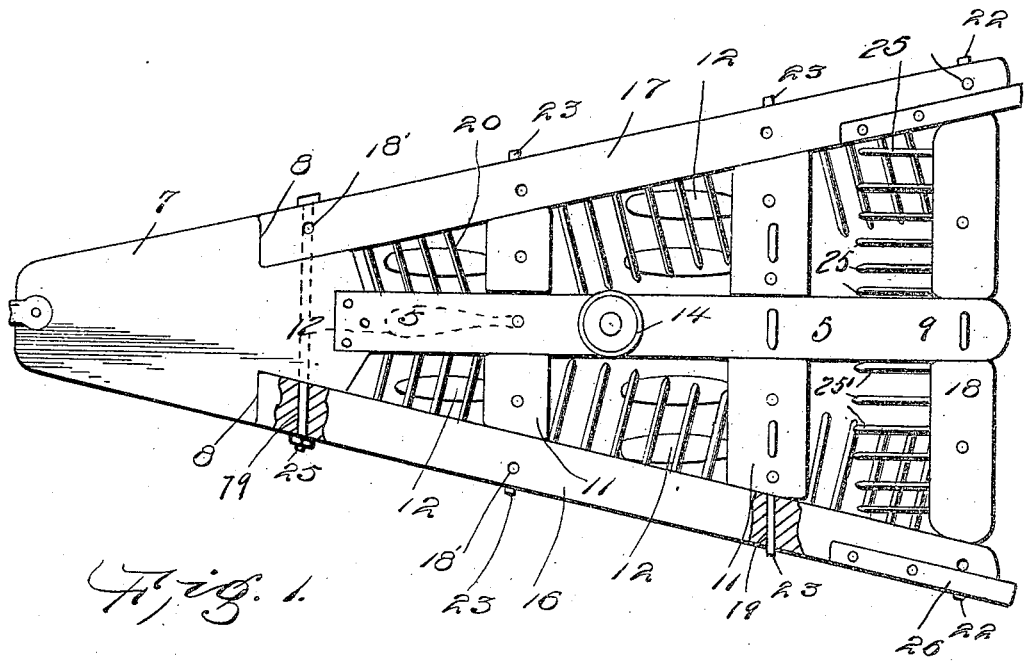
Figure 2:
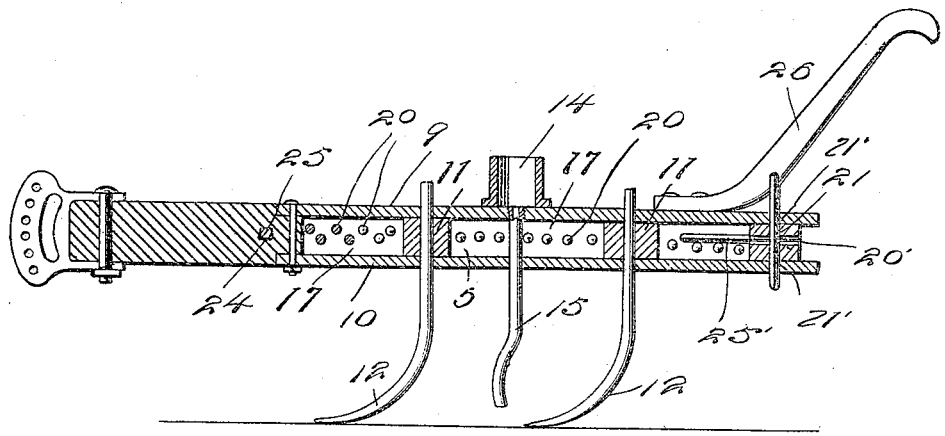

In the drawings forming a portion of this specification, and in which like characters of reference indicate similar parts in the several views, Figure 1 is a top plan view of the implement. Fig. 2 is a vertical longitudinal section through the implement on a somewhat smaller scale. Fig. 3 is a view similar to Fig. 2, showing the implement when used as a harrow. Fig. 4 is a top plan view showing a modification. Fig. 5 is a side elevation with the teeth in depending position.

Referring now to the drawings, the present invention comprises a central portion 5, which consists of a head 7, having recesses 8 in its side adjacent to its rearward end for a purpose to be presently described, and extending rearwardly of the head 7 and centrally thereof are upper and lower spaced plates 9 and 10, which have laterally-extending cross-pieces 11, secured therebetween at intervals throughout their lengths, the rearmost of these cross-pieces being spaced from the rearward ends of the plates 9 and 10, as shown. The cross-pieces 11 are provided with downwardly and forwardly extending shovels 12.

Mounted upon the plate 9 is a hopper 14 for the reception of seed, and this hopper is provided with a spout 15, arranged to discharge the seed into a furrow opened by one of the forward shovels 12 to treat the ground, as will be readily understood.

In connection with the central portion 5 are employed side pieces 16 and 17 and a rear end piece 18, these side pieces being in the form of sills having perforations 18' formed therethrough at intervals throughout their lengths and other perforations 19 formed therethrough at right angles to the perforations 18' and communicating therewith, and extending from a face of each of the side pieces 16 and 17 are a plurality of harrow-teeth 20, these teeth extending from the face through which perforations 19 open.

The rear end piece 18 is provided with a laterally-extending perforation 20' at its center, and a second perforation 21 extending at right angles to the perforations 20 and communicating therewith, and extending outwardly from the ends of the end pieces 18 are pins 22, similar pins 23 extending outwardly from the ends of the cross-pieces 11 of each of the central portions 5.

Formed through the head 7 of the central portion is a perforation 24, which communicates at its ends with the recesses 8, and to arrange the implement to form a planter only the side pieces 16 and 17 are disposed with their forward ends in the recesses 8 and each with one of its perforations 19 in alinement with the perforation 24, and with these alining perforations there is engaged a bolt 25 to hold the parts together, the bolt and the perforations being angular in cross-section to prevent movement of the parts with respect to each other. The perforations 19 which lie between the ends of the side pieces are engaged with the pins 23 of the cross-pieces 11, and the rearmost perforations 19 are engaged with the pins 22 of the rear end piece 18, which is disposed between the rear ends of the plates 9 and 10 and with its perforation 21 in alinement with perforations 21', formed through the plates 9 and 10. As shown, the rear end piece 18 is provided with laterally-extending harrow-teeth 25', similar to the harrow-teeth 20 of the side pieces, and when the end piece is in the position just described these teeth extend forwardly and horizontally, the teeth 20 of the side pieces extending inwardly and horizontally, as shown.

Removably secured to the upper side of the planter just described are handles 26, by means of which the implement may be guided, and the forward ends of the central portion are arranged for the attachment of horses thereto, as shown.

To convert the implement into a harrow, the side pieces 16 and 17 and rear end piece 18 are removed from the central portion 5 and are given a half-turn to direct the harrow-teeth downwardly, when they are again engaged with the central portion, as shown in Fig. 5.

In the first figure the implement is represented as being triangular in general shape, and in Fig. 4 there is illustrated a modification in which side pieces 16 and 17 are shown as extending parallel to the plates 8 and 9 instead of at an angle thereto, and in which the central cross-piece 11 is provided with a plurality of seed-hoppers 14. In this form curved members a and b are employed to connect the side pieces 16 and 17 to the central portion at their forward ends.

In Fig. 3 there is shown a modification in which the central portion 5 is provided with harrow-teeth.

What is claimed is—

1. In an implement of the class described the combination with a central member including a head and vertically-spaced plates projecting rearwardly from the head, of transverse members secured between the plates forwardly of the rearward ends thereof and projecting therebeyond in both directions, the said transverse members having outwardly-extending pins at their outer ends, said members having passages formed therein in which the pins are removably engaged, said members having other passages adapted for the reception of pins, ground-treating devices carried by the side members and arranged to lie in operative position when certain of the passages of the side members are engaged by the pins and out of operative position when other of the passages are engaged by the pins, a transverse member removably engaged between the rearward ends of the plates, said member having passages formed therethrough at right angles to each other, said plates having perforations formed therein adapted for registration with the passages of the last-named member interchangeably, said perforations and passages being adapted for the reception of a pin, and ground-treating teeth carried by the last-named transverse member and extending therefrom, said ground-treating teeth lying in planes parallel with one of the passages of the members.

2. In an implement of the class described, the combination with a central member including a head, vertically-spaced plates projecting from the head, and transverse members secured between the plates and projecting therebeyond in both directions, said transverse members having outwardly-extending pins at their outer ends, of side members having passages formed therein in which the pins are removably engaged, said side members having other passages therein adapted for the reception of the pins, and ground-treating devices carried by the side members, said side members being adapted to lie with their ground-treating devices in operative position when certain of their passages are engaged by the pins, and to lie with their ground-treating devices in inoperative position when their other passages are engaged by the pins.

In testimony whereof I affix my signature in presence of two witnesses.

HENRY WARFIELD.

Witnesses:
J. J. KING,
J. M. SHELLABAYER.